(No Model.) 2 Sheets—Sheet 1.
P. KLING.
WHEEL PLANTER.
No. 387,521. Patented Aug. 7, 1888.
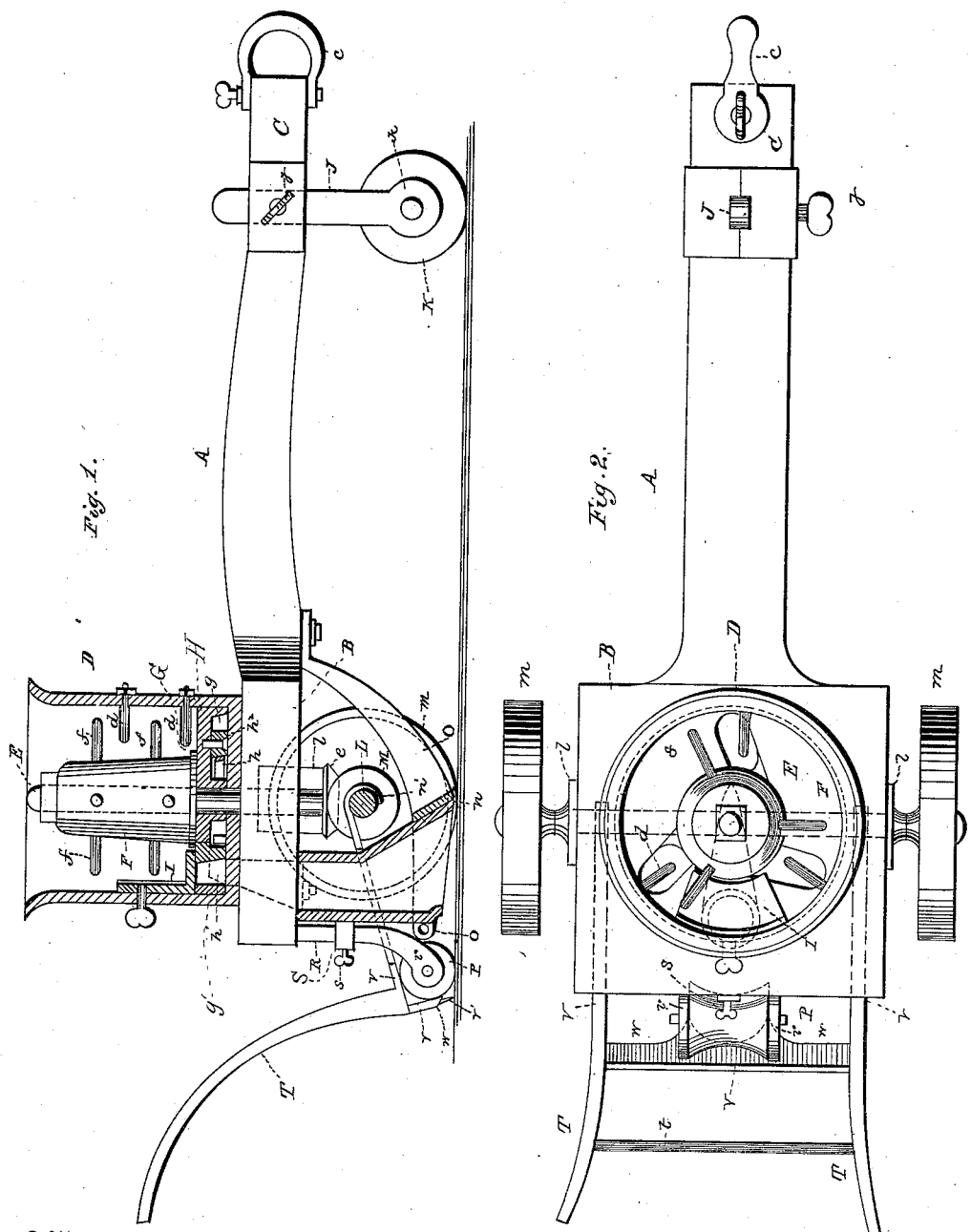
Witnesses,
N. H. Harris
C. R. Ferguson
Inventor,
Peter Kling,
By his Attorney
E. W. Anderson, (No Model.) 2 Sheets—Sheet 2.

P. KLING.
WHEEL PLANTER.

No. 387,521. Patented Aug. 7, 1888.

WITNESSES
M. B. Harris
C. R. Ferguson

INVENTOR
P. Kling,
by E. W. Anderson,
Attorney.

UNITED STATES PATENT OFFICE.

PETER KLING, OF HAYES, TEXAS.

WHEEL-PLANTER.

SPECIFICATION forming part of Letters Patent No. 387,521, dated August 7, 1888.

Application filed November 26, 1887. Serial No. 256,274. (No model.)

*To all whom it may concern:*

Be it known that I, PETER KLING, a citizen of the United States, and a resident of Hayes, in the county of Robertson and State of Texas, have invented certain new and useful Improvements in Wheel-Planters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 4:
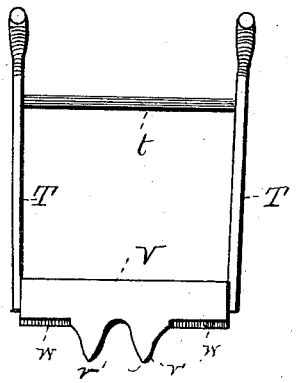
Figure 3:
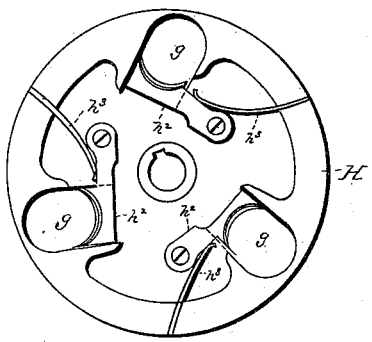
Figure 5:
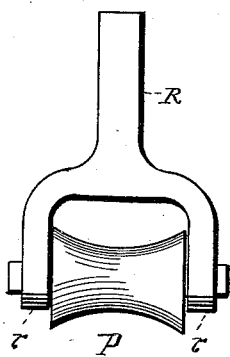

Figure 1 of the drawings is a side elevation, partly in section, of my improved planter. Fig. 2 is a top or plan view. Fig. 3 is a bottom view of the revolving disk. Fig. 4 shows the handles having the harrow and scraping-plate thereon, and Fig. 5 shows the covering-roller and standard.

The invention relates to wheel-planters, being an improvement on a patent granted to me on the 4th day of October, 1870, and numbered 108,032; and it consists in the construction and novel combination of parts hereinafter described, and pointed out in the appended claims.

Referring to the drawings by letter, A designates the frame of the machine, consisting of the hopper-platform B and tongue C, which has engaged to its ends the clevis c. The hopper D, provided with the inwardly-standing stirring-arms d, the central vertical shaft, E, having the bevel-gear e upon it below the hopper-platform, the drum F, secured to the shaft E within the hopper and carrying the stirring-arms f, the plate G at the base of the hopper and provided with discharge-opening g and cam-pin g', the rotatory disk H, having the recess or concavity in its lower side and provided with the projections h, discharge-opening h', pivoted arms h², and springs h³, and the detachable retaining-foot or cut-off I for said disk are all of identical construction to those shown in my patent hereinbefore referred to.

J is a standard passing through a slot in the tongue near its forward end and rendered vertically adjustable by means of the pin j, which passes through openings in the standard and through the tongue. The lower end of the standard is bifurcated, and in the arms k k of the bifurcation is journaled the shaft of the guide-wheel K.

L is the main axle of the machine, journaled in bearings in the ends of hangers l l, secured to the opposite side edges of the hopper-platform, and M is a bevel-gear secured to said axle and meshing with the bevel-gear e, so that the rotation of the wheels m on the main axle rotates the shaft E, causing the stirring-arms f to revolve, and also rotates the disk H.

N is the seed tube or drill secured to the lower surface of the hopper-platform and having the forwardly-projecting portion n, as in my above-mentioned patent.

O is a furrow-opener or shoe bifurcated at its lower end, so as to embrace the foot of the seed-tube and be secured thereon by a bolt, o, which passes through openings in the arms of the bifurcation in rear of the said tube, and is secured by a suitable nut, as shown. The upper front end of the furrow-opener is bolted to the lower surface of the tongue, and the upper orifice of the seed tube registers with the discharge-opening g of the plate G.

P is a covering-roller similar to that shown in my above-mentioned patent and journaled in the arms r r of the bifurcated lower end of the standard R. The said standard passes through an opening in a bearing-block, S, secured to the rear surface of the seed-tube, and its end, when in its highest position, abuts against the lower surface of the hopper-platform, which serves as a stop to prevent it being set too high. The covering-roller is adjusted vertically by the set-screw s, which engages in a tapped opening in the rear surface of the bearing-block and impinges on the standard R, as shown.

T T are the handles, connected near their bends by the cross-bar t, and provided at their lower ends with the inwardly-standing arms v, having the hooks v' at their ends to engage over the main shaft L, so that the handles can be raised and lowered at will on said shaft.

V is a harrow and scraper-plate, connecting and preferably made integral with the arms v, and having the harrow-teeth v' v' and the inwardly-beveled scrapers W on its lower edge. The said scraper's edges W lie against the covering-roller and remove the adhering soil when it rotates, and the harrow-teeth $v'$ $v'$ can be depressed more or less deeply in the soil by lowering or raising the handles.

Having described my invention, I claim—

1. In a planter, the combination, with the hopper provided with the stirrer-arms, the rotating shaft having the stirrer-arms, the disk H, having the discharge-openings, pivoted arms, and springs, the plate $g$, having the cam-pin and discharge-opening, and the shaft E, having the bevel-gear $e$, of the main axle adapted to engage the hooked ends of the handles and having the beveled gear M and the conveying-wheels thereon, substantially as specified.

2. The combination, with the main frame and main axle, of the handles provided with inwardly-extending arms having their inner ends hooked and engaged over the main axle, and the toothed harrow-plate secured across the junction of the handles with said arms, substantially as specified.

3. The combination, with the main frame, main axle, and covering-roller, of the handles having inwardly-extending arms hooked at the inner ends to engage over the main axle, and the bevel-edged scraper-plate secured across the junction of the handles and said arms, substantially as specified.

4. In a planter, the combination, with the main frame, main axle, and vertically-adjustable covering-roller, of the handles T, arms $v$, having their ends hooked to engage over the main axle, and the harrow and scraper-plate V, provided with the teeth $v'$ and inwardly-beveled scraper-edges W, substantially as specified.

In testimony whereof I affix my signature in presence of two witnesses.

PETER KLING.

Witnesses:
G. D. CAMPBELL,
JNO. C. MOORE.